United States Patent [19]

Holmes et al.

[11] Patent Number: 4,787,678

[45] Date of Patent: Nov. 29, 1988

[54] OUTBOARD BEARING SUPPORT

[75] Inventors: William K. Holmes, Simi Valley; Albert E. Joneikis, Long Beach, both of Calif.

[73] Assignee: Cushion Cut, Inc., Torrance, Calif.

[21] Appl. No.: 147,844

[22] Filed: Jan. 25, 1988

[51] Int. Cl.[4] .......................... F16C 35/12; B28D 1/04
[52] U.S. Cl. .................... 299/39; 384/542; 474/903
[58] Field of Search ............ 299/39, 41; 404/90; 474/902, 903; 384/542, 537, 584, 585

[56] References Cited

U.S. PATENT DOCUMENTS

| | | | |
|---|---|---|---|
| 1,959,871 | 4/1931 | Liggett | 74/410 |
| 2,253,591 | 8/1941 | Travis et al. | 474/902 |
| 2,549,154 | 4/1951 | Amos | 384/542 |
| 3,084,561 | 5/1960 | Mattson | 74/6 |
| 3,165,004 | 1/1965 | Kumro | 474/903 |
| 3,922,558 | 11/1975 | Hollyoak | 74/6 X |
| 3,927,954 | 12/1975 | Walker | 474/86 X |
| 4,664,645 | 5/1987 | Muck et al. | 299/39 X |

*Primary Examiner*—Jerome W. Massie, IV
*Assistant Examiner*—David J. Bagnell
*Attorney, Agent, or Firm*—Nilsson, Robbins, Dalgarn, Berliner, Carson & Wurst

[57] ABSTRACT

A rigid arm supports the outboard end of a shaft of a power driven apparatus to minimize transverse deflection of the shaft under load. The arm extends through a loop formed by a flexible drive member and permits replacement of the drive member without removal of the arm. In a preferred embodiment, the arm is a cantilevered arm of substantially rectangular cross section which is bolted or otherwise secured to the apparatus and has a bearing at its outer end which engages the output shaft.

15 Claims, 3 Drawing Sheets

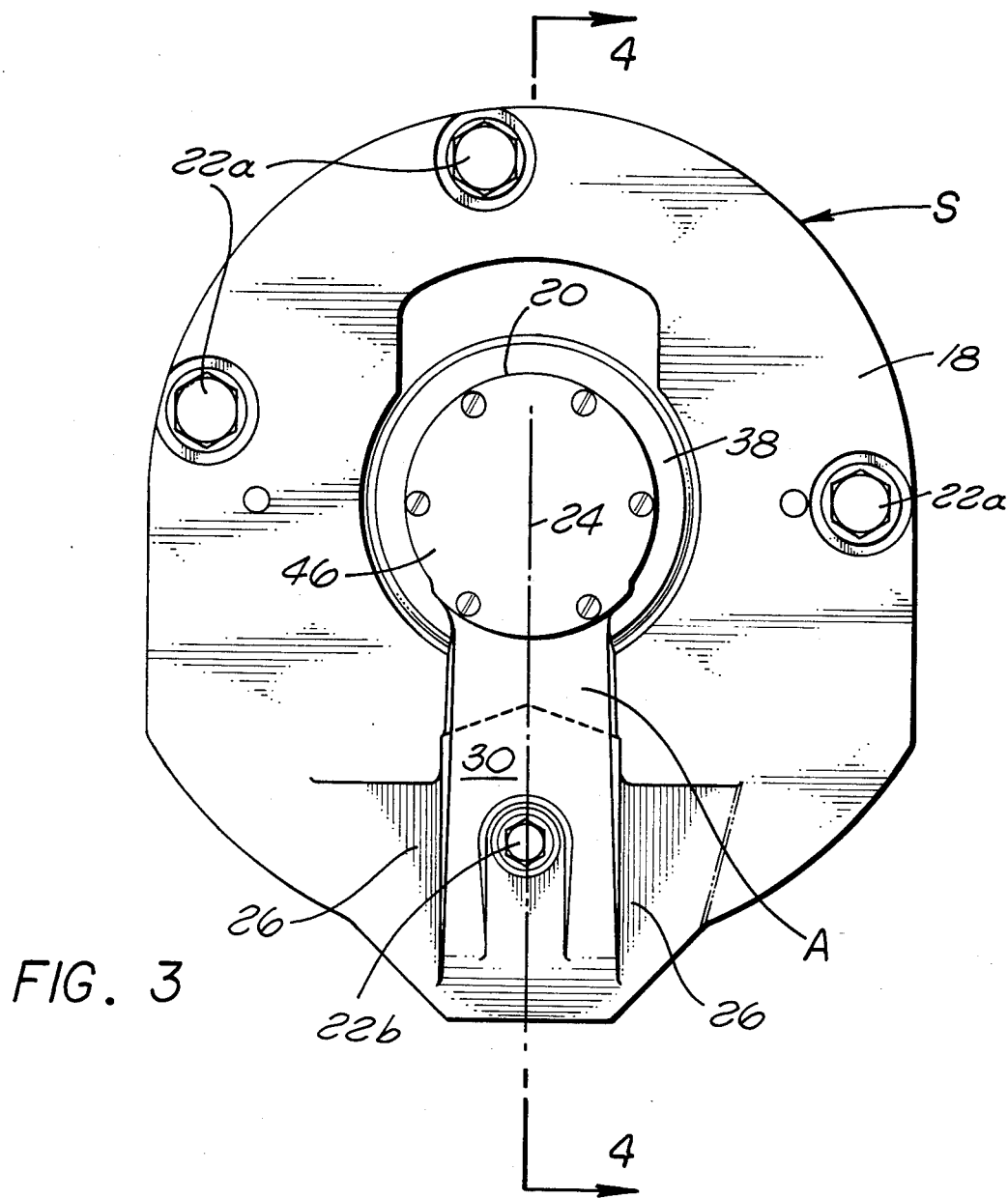
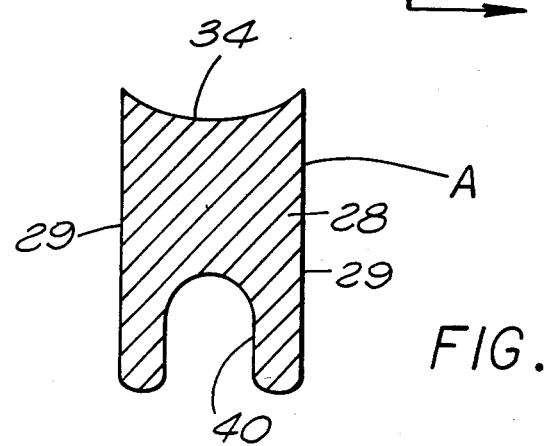
FIG. 3
FIG. 5

OUTBOARD BEARING SUPPORT

BACKGROUND OF THE INVENTION

The present invention relates to power driven rotary machines and, more particularly, to a structure capable of supporting the outboard end of a rotating shaft without interfering with removal and replacement of a belt or other member driven by the shaft.

Power driven machines, such as saws for cutting concrete, typically use V-type drive belts to transmit power from an output shaft to a separate driven shaft. In a concrete saw, a diamond blade is carried for rotation with the driven shaft. Interaction with the belts produces transverse forces which deflect the output shaft and induce bending fatigue. This can cause the shaft to fail prematurely by breaking. Because the output shaft of an internal combustion engine is an extension of its crankshaft, it is usually not feasible to strengthen the shaft itself. Deflection of the shaft also promotes slippage of the drive belts, reducing the amount of power transmitted and shortening belt life.

Some concrete saws have been provided with an outboard bearing carried by a framework which surrounds the crankshaft to limit transverse deflection. In such cases, however, it is necessary to disassemble, reassemble and align the support each time a drive belt is replaced. This procedure is time consuming and difficult to carry out in the field, particularly under extreme working conditions.

Therefore, it is desirable in many applications to support the outboard end of a rotating shaft against transverse stresses in a manner which does not interfere with the replacement of belts or other force transmitting members engaged by the shaft.

SUMMARY OF THE INVENTION

The present invention solves the problem of transverse deflection of a rotating shaft by providing a bearing at the end of a rigid cantilevered arm to support the outboard end of the shaft. The arm extends through an opening formed by a drive belt or other force transmitting member rather than encompassing the belt and the shaft. This enables the belt to be slipped over the shaft and the arm for replacement without disassembling the support.

A preferred embodiment of the invention possesses a number of other features which contribute to rigidity of the support and minimize deflection of the shaft despite the fact that cantilevered arms are subjected to stresses as great as 60 times those encountered in designs with multiple points of support. These features include design of the support as a massive member of substantially rectangular cross section and use of a threaded fastener passing through the center of the arm to anchor it in place. A multiple sheave and integral stub shaft arrangement receives the output shaft closely along its length. It acts as a reinforcing tube which stiffens the shaft due to a high moment of inertia about transverse bending axes.

The support device of the present invention reduces deflection of an output shaft to a minimum, even under extreme load. When used on the 65 horsepower 4-cylinder engine of Concrete Saw Model 6500RW Concrete Saw of the Longyear Company of Sun Valley, Calif., crankshaft deflection is reduced to no more than 0.0002–0.0005 inches under maximum drive load.

Accordingly, the present invention relates to a device for supporting a free end of an output shaft of a primary rotary structure which is linked to a secondary rotary structure through at least one flexible force transmitting member, and to the apparatus on which the support device is installed. The device has: a base portion mounted to the primary structure in a preselected operative position of the support device; a rigid arm extending from the base portion and through a loop formed by the force transmitting member to a location adjacent the free end of the output shaft in the operative position; and a bearing portion carried by the rigid arm to support the free end of the output shaft against transverse deflection. In a preferred embodiment the primary structure is a motor and the secondary structure is a rotating element, such as a saw blade, which is driven by the motor. The support device is also preferably cantilevered from the base portion and is substantially rectangular in cross section.

BRIEF DESCRIPTION OF THE DRAWINGS

The above and other features of the present invention may be more fully understood from the following detailed description, taken together with the accompanying drawings, wherein similar reference characters refer to similar elements throughout and in which:

FIG. 3 is an enlarged elevational view of the concrete cutting saw of FIG. 1 in the area of the support base, with the belts removed and with the saw rotated counterclockwise so that the rigid arm is at the bottom;

FIG. 5 is a vertical sectional view taken in the direction 5—5 of FIG. 4.

DESCRIPTION OF THE PREFERRED EMBODIMENTS

Figure 1:
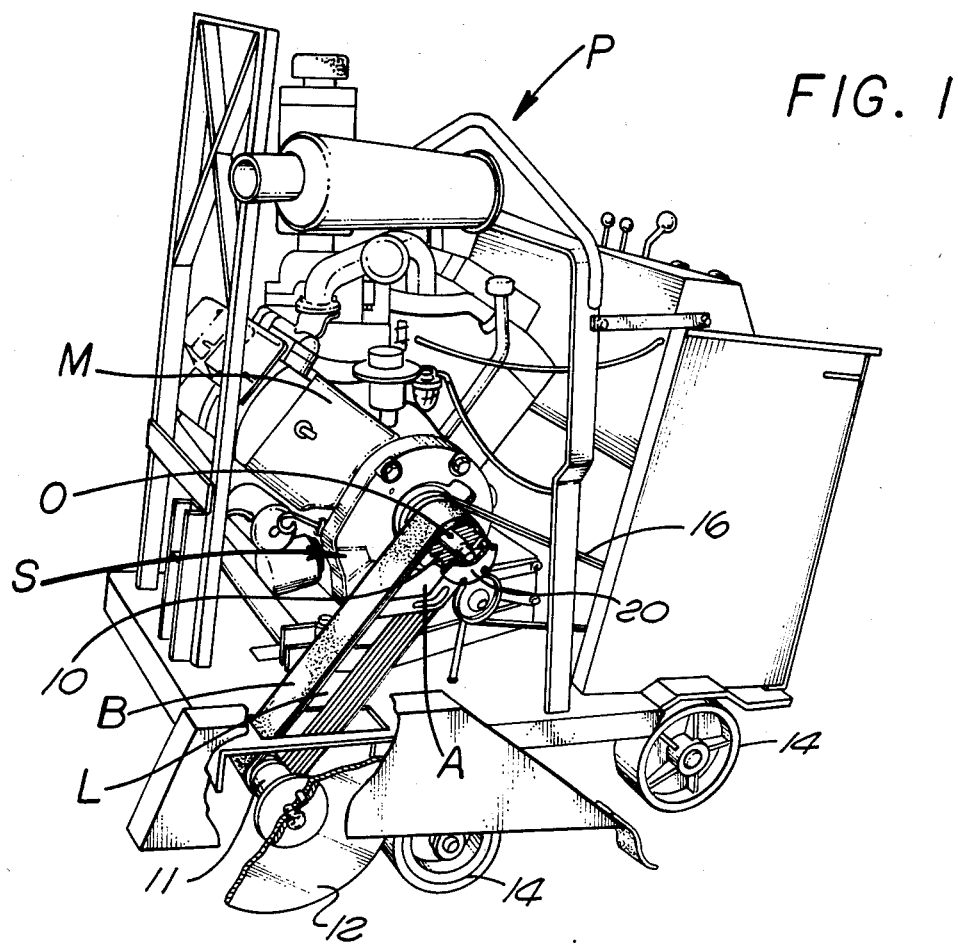
FIG. 1 is a perspective view, partially broken away, of a concrete cutting saw having an outboard bearing support constructed according to a preferred embodiment of the invention.

Referring now to the drawings, specifically FIG. 1 thereof, a power driven apparatus P constructed in accordance with a preferred embodiment of the invention has a motor M with an output shaft O supported against transverse bending stresses by a support structure S. The support structure has a cantilevered rigid arm A which extends through a loop L formed by a primary drive belt B. This permits the drive belt to be replaced by merely slackening a belt adjustment mechanism (not shown) and lifting the drive belt over the arm. It is not necessary to remove any part of the support S.

In the illustrated embodiment, the apparatus P is a self-propelled saw for cutting concrete and the output shaft O is an extension of the crankshaft of an internal combustion engine. The drive belt B is driven by a sheave structure 10 which is keyed to the output shaft O and in turn drives a blade shaft 11 with an associated saw blade 12. Motive power is provided to wheels 14 by a propulsion pump (not shown) which is driven by the motor through an auxiliary drive belt 16.

Figure 2:
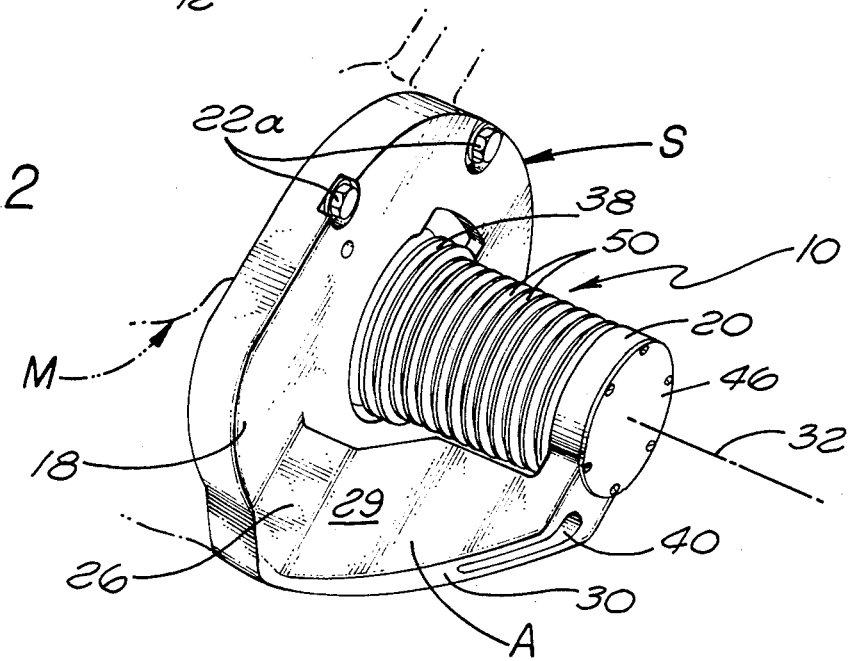
FIG. 2 is an enlarged perspective view of the concrete cutting saw of FIG. 1 in the area of the support device, with the belts removed and the engine shown in phantom lines.
Figure 4:
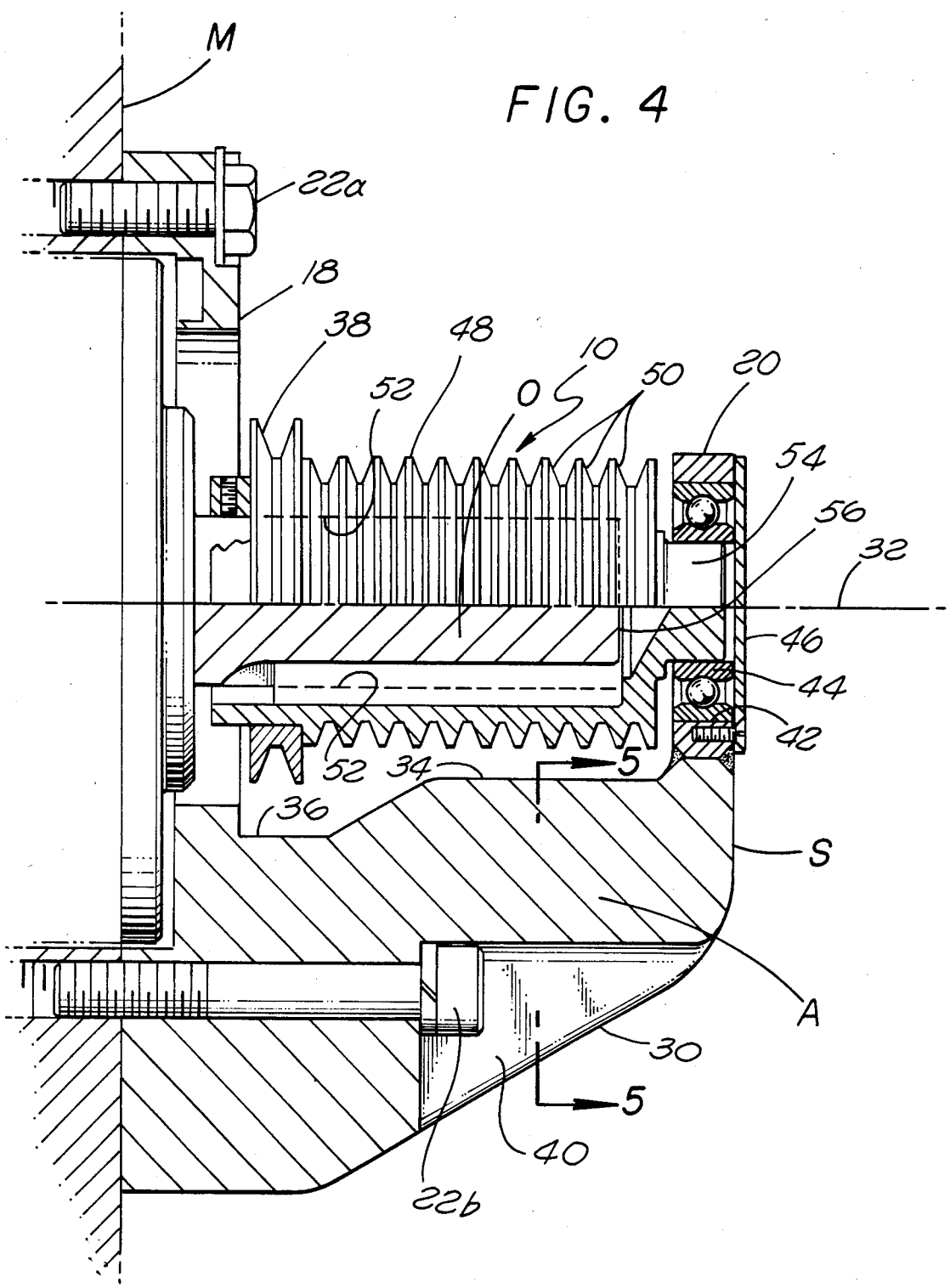
FIG. 4 is a partial vertical sectional view taken in the direction 4—4 of FIG. 3.

Referring to FIGS. 2–4, the support S includes a base portion 18 which supports one end of the arm A and a bearing portion 20 disposed at another end of the arm to engage the output shaft. The base portion 18 is mounted on the side of the motor and encircles the output shaft O to anchor the support. Attachment to the motor is achieved by mounting bolts 22a and 22b which are spaced about the output shaft. The support S is designed so that the mounting bolts engage preexisting threaded openings 24 (FIG. 4) in the side of the motor M. Such openings are typically provided by the manufacturer of the motor to facilitate the mounting of bell housings or other power transmission components. In the embodiment illustrated, wherein the motor M is a four-cylinder internal combustion engine of approximately 65 horsepower, four openings are provided and four bolts are used. Three of the mounting bolts (22a) pass only through the base portion 18. The fourth bolt (22b) passes through the rigid arm A, as well, along a center line 24 thereof (FIG. 3).

The arm A is cantilevered from the base portion 18 and is strengthened at the point of connection to the base portion by heavy gussets 26. The arm has a substantially rectangular cross section 28 (FIG. 5). It is made as massive as possible without interfering with the drive belt B, or the sheave structure 10. Thus, the arm has flat side surfaces 29 and an outer surface 30 which tapers toward the axis of rotation 32 of the output shaft. The inner surface of the arm has a region 34 spaced just far enough from the sheave structure 10 to prevent interference with it. The inner surface has a cutout region 36 adjacent to the base portion to accommodate an enlarged sheave 38 provided at the inner end of the sheave structure 10 to drive the auxiliary belt 16.

With reference to FIG. 5, the surface 34 is a convex surface concentric with the sheave structure 10 to provide the greatest amount of arm material and therefore the highest possible stiffness. The outer surface 30 has a recess 40 for the mounting bolt 22b. The bolt 22b is preferably an allen-head bolt so that the recess 40 can be as small as possible. Thus, the arm A is constructed to maximize the strength and rigidity of the support S and thereby minimize deflection of the output shaft O.

The bearing portion 20 of the support S has a bore 42 for reception of a self-lubricating bearing 44 centered about the rotational axis 32. The bearing 44 is held in place by a bearing plate 46. All components associated with the bearing 44 are designed with extremely close tolerances in order to minimize deflection of the end of the output shaft O.

Referring specifically to FIG. 4, the sheave structure 10 further reduces deflection of the output shaft by receiving the shaft closely at all points along its length. Thus, the sheave structure 10 includes a single integral body 48 having an outer surface which defines a plurality of sheave grooves 50 and a smooth inner bore 52 of substantially the same diameter as the output shaft O. The body 48 acts as a tube encasing the output shaft O and stiffens the output shaft as will be appreciated by a worker skilled in the art. That is, the body 48 of the sheave structure 10 has a high moment of inertia about a transverse bending axis and adds substantially to the stiffness of the output shaft. Whereas a shaft supported only at its ends can deflect along its length, the sheave structure substantially eliminates such deflection within the load ranges encountered in concrete cutting saws.

The body 48 also has an integral stub shaft 54 which extends axially beyond the outer end 56 of the output shaft O. This permits a maximum number of sheave grooves 50 to be used and enables more power to be transmitted by the belts without increased crankshaft deflection.

On a 65 horsepower concrete cutting saw of the type illustrated in FIG. 1, the support S described herein substantially eliminates transverse deflection of the output shaft O. A saw of this type without an outboard support and using a "10-wide" drive belt B can stress the output shaft C severely enough to break it off at the side of the engine. The disclosed structure, however, reduces total transverse deflection to a maximum of 0.0005 inches, and preferably less than 0.0002 inches. Such deflections are well within the tolerances of most engine manufacturers.

The support S is preferably a single piece of cast steel or other suitable material. However, it can be made of a plurality of discrete pieces of heavy gauge metal welded or otherwise connected together to form a rigid unit. In either case, the support S should be essentially rigid to provide adequate support in cantilevered form.

In operation, the support S need not be removed from the motor for replacement of the drive belt B. The drive belt is installed initially by slipping it over the support S, the sheave structure 10 and the output shaft O to the position illustrated in FIG. 1. This is done with the tension adjustment (not shown) loosened sufficiently to provide clearance. The opposite end of the primary belt B is slipped over the saw blade 12 and a similar sheave associated with the blade shaft 11. Tension is provided by increasing the distance between the axis 32 of the output shaft O and the axis of rotation of the blade shaft 11. The apparatus P is then ready for use in cutting sections of concrete such as those encountered in highway reconstruction.

The support S and the sheave structure 10 bear a large portion of the transverse stress during a cutting operation and prevent undesired deflection of the output shaft O. This reduces forces which would otherwise be borne by the shaft and prevents the engine bearings from being subjected to transverse moments. When the drive belt B breaks or wears out, the belt can be replaced by slackening the adjustment mechanism and slipping the belt over the shaft O, the arm A and the bearing portion 20. Replacement of the drive belt B can thus be accomplished quickly in the field without sophisticated tools, as compared to the more lengthy and complicated procedure of the prior art.

From the above, it can be seen that the structure of the present invention supports the outboard end of a rotating shaft against lateral deflection and yet does not interfere with removal or replacement of the primary drive belt associated with the shaft.

The appended claims are not limited to the embodiments described herein, but rather are intended to cover all variations and adaptations falling within the true scope and spirit of the present invention. For example, the output shaft supported by the claimed device need not be a motor shaft. Likewise, the motor M need not be an internal combusion engine but can be an electric motor or other rotary apparatus exposed to transverse stress. The invention is also not limited to devices in which power is transmitted by drive belts and sheaves. Instead, it is applicable to any device in which forces are transmitted by a flexible force transmitting member which forms a continuous loop. Such members include, without limitation, chain and cable drive systems.

What is being claimed:
1. Power driven apparatus comprising:
   frame means;

a primary rotary structure mounted to the frame means and having an output shaft extending along a preselected axis of rotation to a free outer end;

a secondary structure rotatably mounted to the frame means;

means for transmitting rotational forces between the output shaft and the secondary structure, said force transmitting means comprising at least one flexible, elongated member which forms a continuous loop; and a support device having:

a base portion mounted to the primary structure adjacent to the output shaft;

a rigid arm extending from the base portion and through the loop formed by the flexible member to a location adjacent the free end of the output shaft; and a bearing portion carried by the rigid arm at said location to support the free end against transverse deflection.

2. The power driven apparatus of claim 1 wherein:
the primary structure is a motor; and
the secondary structure is a rotating element driven by the motor.

3. The power driven apparatus of claim 2 wherein:
the flexible, elongated member comprises at least one belt; and
the means for transmitting rotational forces further comprises first and second means for engaging the belt with the output shaft and the driven element, respectively;

4. The power driven apparatus of claim 3 wherein:
said first means further comprises an integral stub shaft extending axially from the sheave structure to engage the bearing portion of the support device at a location axially beyond the output shaft.

5. The power driven apparatus of claim 2 wherein:
the apparatus is a concrete saw; and
the driven element includes a saw blade.

6. The power driven apparatus of claim 5 in which:
the saw blade is mounted to the frame means for rotation about an axis parallel to the preselected axis of rotation.

7. The power driven apparatus of claim 1 wherein:
the rigid arm is cantilevered from the base portion.

8. The power driven apparatus of claim 1 wherein:
the rigid arm is substantially rectangular in cross section.

9. The device of claim 1 wherein:
the base portion forms a ring substantially encircling the output shaft in the operative position of the device.

10. The device of claim 9 wherein:
the base portion forms a continuous ring mounted to the machine by a plurality of threaded fasteners; and one of the fasteners extends through the rigid arm adjacent to the base portion.

11. The device of claim 10 wherein:
the rigid arm has a longitudinal center line; and
said one of the fasteners passes through the center line.

12. A device for supporting a free end of an output shaft of a primary rotary structure which is linked to a secondary structure through at least one flexible force transmitting member forming a continuous loop, comprising:

a base portion mountable to the primary structure in a preselected operative position of the support device;

a rigid arm extending from the base portion and through the loop formed by the force transmitting member to a location adjacent the free end of the output shaft in said operative position; and a bearing portion carried by the rigid arm at said location to support the free end against transverse deflection.

13. The device of claim 12 wherein:
the rigid arm is cantilevered from the base portion.

14. The device of claim 13 wherein:
the rigid arm is substantially rectangular in cross section.

15. The device of claim 12 wherein:
the base portion forms a ring substantially encircling the output shaft in the operative position of the support device.

* * * * *

UNITED STATES PATENT AND TRADEMARK OFFICE
CERTIFICATE OF CORRECTION

PATENT NO. : 4,787,678

DATED : November 29, 1988

INVENTOR(S) : William K. Holmes and Albert E. Joneikis

It is certified that error appears in the above-identified patent and that said Letters Patent is hereby corrected as shown below:

Col. 3, line 7, delete "24";

Col. 3, line 32, delete "convex" and substitute therefor --concave--.

Signed and Sealed this

Sixteenth Day of May, 1989

Attest:

DONALD J. QUIGG

Attesting Officer

Commissioner of Patents and Trademarks